US005778277A

United States Patent [19]
Wenthe, Jr. et al.

[11] Patent Number: 5,778,277
[45] Date of Patent: Jul. 7, 1998

[54] TILTED SCAN RAIL

[75] Inventors: Stephen J. Wenthe, Jr., West Henrietta; Gordon B. Reid, Walworth; Frederick B. Clark, West Henrietta; Jack K. Fullerton, Webster, all of N.Y.

[73] Assignee: Xerox Corporation, Stamford, Conn.

[21] Appl. No.: 736,859

[22] Filed: Oct. 25, 1996

[51] Int. Cl.$^6$ .................................................. H04N 1/04
[52] U.S. Cl. .................................................. 399/31; 358/474
[58] Field of Search .......................... 355/72, 75; 399/31, 399/32, 151, 200, 202, 209, 211; 358/474, 494, 497

[56] References Cited

U.S. PATENT DOCUMENTS

| 4,982,236 | 1/1991 | Bock | 355/235 |
| 5,194,898 | 3/1993 | Costrop et al. | 355/236 |
| 5,659,405 | 8/1997 | Prevost et al. | 358/486 |

FOREIGN PATENT DOCUMENTS

| 0359568 | 3/1990 | European Pat. Off. |
| 0503165 | 9/1992 | European Pat. Off. |

*Primary Examiner*—Daniel P. Malley
*Attorney, Agent, or Firm*—John M. Kelly

[57] ABSTRACT

A scanning system that accurately positions a moving carriage assembly in two directions relative to a platen. Such a scanning system includes a frame that has a registration member that extends in the Y direction, and a platen whose plane is normal to the Z direction and which is attached to the frame. The platen receives a substrate in a predetermined position relative to the registration member. The scanning system further includes a base that has a first and second tilted surfaces that extend in the Y direction, and a moving carriage assembly that is disposed between the platen and the base. The moving carriage assembly includes a housing, at least one button connected to the housing, and first and second biased pivot arms with first and second rollers that ride on the first and second tilted surfaces. The biased pivot arms push the housing against the tilted surfaces such that the button contacts the platen and the registration member. Furthermore, the moving scan imaging system also includes a motion inducing system for moving the moving carriage assembly relative to the platen. Beneficially, when the motion inducing system moves the moving carriage assembly the first and second rollers slide and roll along on the tilted surfaces and therefore bias the button toward the registration member.

4 Claims, 3 Drawing Sheets

TILTED SCAN RAIL

This invention relates to document scanning systems. More particularly, it relates to document scanning systems having improved scanner travel assemblies.

BACKGROUND OF THE INVENTION

Many machines use optical input scanners. For example, facsimile machines and many copiers scan an original document and convert the scanned image into a digital representation. A digital representation is advantageous since it can be stored, manipulated, enhanced, transmitted, and/or printed many times with no reduction in quality. While many types of scanners are known, in one type a document being scanned is placed on a stationary platen and illuminated by a moving light source. Light reflected from the document is modulated in accordance with the image on the document. That modulated light is captured by an array of light sensors that digitize the captured light to produce the digital representation.

Many versions of the type of optical scanner described above use an elongated light source, such as a fluorescent lamp, to illuminate the substrate and an elongated array of photodetectors to capture the reflected light. Beneficially, the light source and the photodetector are both mounted on a moving carriage. Then, by moving that carriage along the document the document's image is scanned. Some prior art scanners use charge coupled devices that are mated to a set of reduction (say 9:1) optics. Newer photodetector arrays often use a plurality of photodiodes (or phototransistors) that are mated to a plurality of gradient index lenses. Generally, gradient index lenses use 1:1 optics.

The scanning quality of a moving carriage scanning system depends on many factors. For example, the number of photodiodes, the accuracy with which the gradient index lenses focus the light reflected from a document, the accuracy of the motion of the moving carriage, and the accuracy and parallelism with which the document being scanned is aligned with the moving carriage. For purposes of understanding the motivation of the present invention, it should be understood that even small deviations from the ideal spatial position of the document being scanned relative to the spatial position of the moving carriage can seriously degrade performance. For optimum performance it is necessary to ensure that the document being scanned is accurately located in a predetermined position and that the moving carriage is accurately aligned to scan a document in that predetermined position.

Techniques of accurately positioning a document in a predetermined position are well known. Typically, a document is moved by a document handling system from an input feeder onto a flat, transparent platen such that at least one edge of the document is registered with an edge guide that aligns the document in one direction, say the Y direction. The document is frequently aligned in another direction, the X direction, using photosensors/phototransmitters or some other type of detector system that senses when a document is advanced to a predetermined position. Finally the document is located on a flat platen, possibly using some type of downward pressure. This aligns and flatensthe document in the Z direction.

With a document accurately located in a predetermined position, to achieve optimum performance the moving carriage must accurately align with that position. While various types of moving carriage alignment mechanisms are known, probably the most widely used prior art system has a pair of fixed guide rails that are mounted in a parallel plane beneath the platen. The moving carriage is then mounted on the guide rails and attached to one or more motion inducing cables. The cables, which are driven by a motor, drive the carriage back and forth along the guide rails. By accurately locating the guide rails relative to the platen, and by accurately driving the moving carriage and its optical components relative to the document, the document can be accurately scanned, at least when using a moving carriage having charge coupled devices and reduction optics. However, the use of guide rails with gradient index lenses may not be optimal.

One problem with using prior art guide rail systems with gradient index lenses is that proper alignment in the Z direction becomes critical. Without the relatively large optical reductions in the lens systems typically used with charge coupled devices even small deviations in the Z direction can significantly defocus the resulting image. Even minor manufacturing and assembly tolerances, particularly when combined with thermal gradients and thermal expansions of the various optical components and mountings, can significantly degrade imaging quality. Furthermore, guide rail systems are somewhat uneconomical since they require excessive assembly, alignment and precision rails.

A previously proposed moving carriage assembly for systems that use gradient index lenses is illustrated in FIG. 1. As shown, a glass platen 2 is located in a fixed plane. While a document and its document handling system are not shown for clarity, it is to be understood that a document being imaged is accurately positioned on top of the glass platen. Beneath the platen is a single guide rail 4. Located above that guide rail, but immediately below the platen, is a moving carriage 6 that holds a flourescent bulb and a photodiode array with gradient index lenses. Again, for clarity the flourescent bulb and the photodiode array are not shown in FIG. 1. The guide rail and carriage are spring biased upwards by two springs 8 (which are to be understood as pivoting against a bottom plate or base). The moving carriage includes two rollers 10 that contact and roll on the underside of the glass platen 2. The moving carriage 6 is captivated on the rail 4 at location 12. Therefore, the rail 4 and the moving carriage 6 are both driven upward by the springs 8 such that the rollers 10 ride on the underside of the glass platen 2. By accurately locating the photodetector array and the gradient lenses relative to the top of the rollers 10, the gradient index lenses are accurately positioned in the Z direction relative to the glass platen. Still referring to FIG. 1, a bi-directional drive motor 14 drives cables 16 that are wrapped around numerous pulleys and that is attached to the moving carriage 6 near each of the rollers 10 such that the moving carriage is pulled back and forth along the guide rail 4.

While the assembly shown in FIG. 1 can accurately locate optical components in the Z direction, it can be difficult to accurately locate optical components in the Y direction using that technique. For example, the cables may stretch so as to create location errors or tilting of the moving carriage, or small disturbances or vibrations may cause unwanted sideways motion (along the Y-direction).

Therefore, a technique of implementing a moving carriage such that its optical components are accurately located relative to a platen in both the Z direction and the Y direction when the carriage moves in the X direction would be advantageous. Particularly advantageous would be such a technique which could be implemented at low cost.

SUMMARY OF THE INVENTION

The principles of the present invention provide for a moving scan imaging system capable of accurately positioning a sensor array in both the Z and the Y directions relative to a document-holding platen. Such a moving scan imaging system includes a frame that has a registration member that extends in the Y direction, and a platen attached to that frame. The platen receives a substrate in a predetermined position relative to the registration member. The moving scan imaging system further includes a base that has a first and second tilted surfaces that extend in the Y direction and a moving carriage assembly that is disposed between the platen and the base. The moving carriage assembly includes a housing, at least one button (preferrably 3 or 4) connected to the housing, and first and second biased pivot arms with first and second rollers that ride on the first and second tilted surfaces. The biased pivot arms push the rollers against the tilted surfaces such that the button contacts the platen and the registration member. Furthermore, the moving scan imaging system also includes a motion inducing system for moving the moving carriage assembly relative to the platen. Beneficially, when the motion inducing system moves the moving carriage assembly the first and second rollers slide and roll on the tilted surfaces, biasing the button into contact with the registration member.

DESCRIPTION OF THE PREFERRED EMBODIMENT

Figure 1:
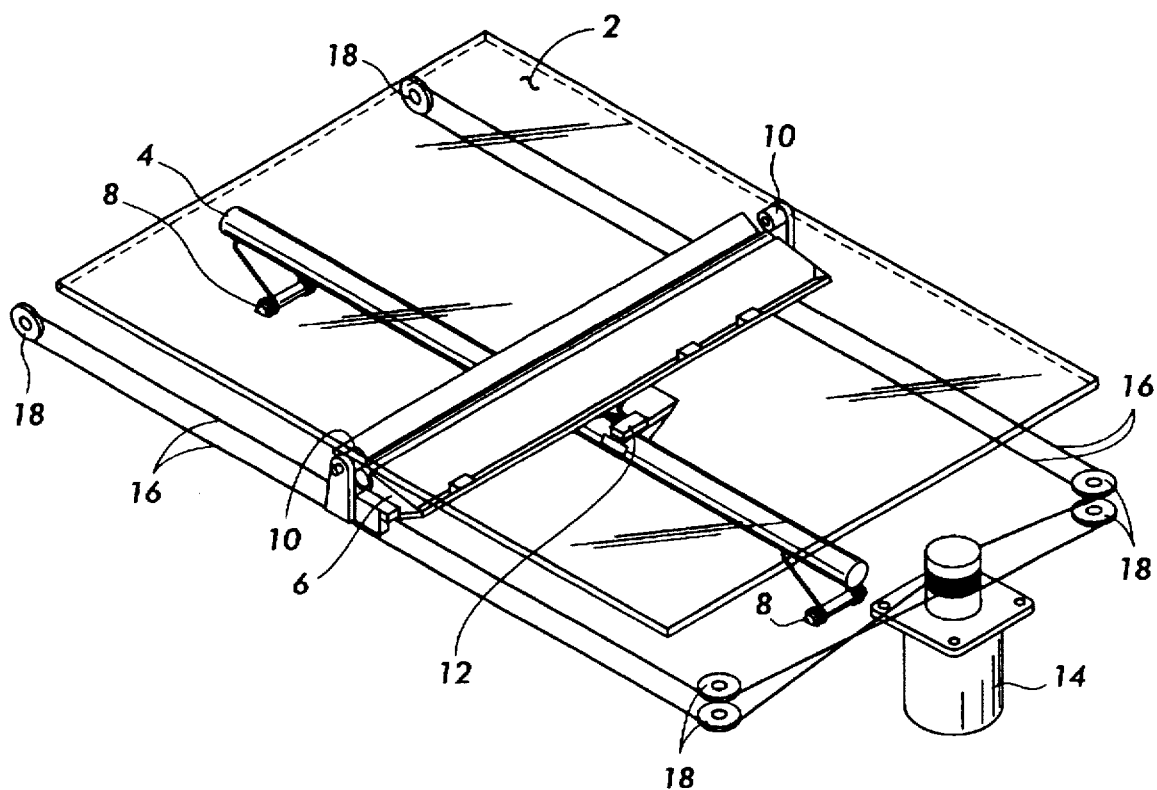
FIG. 1 presents a schematic depiction of a previously proposed moving carriage imaging system.
Figure 2:
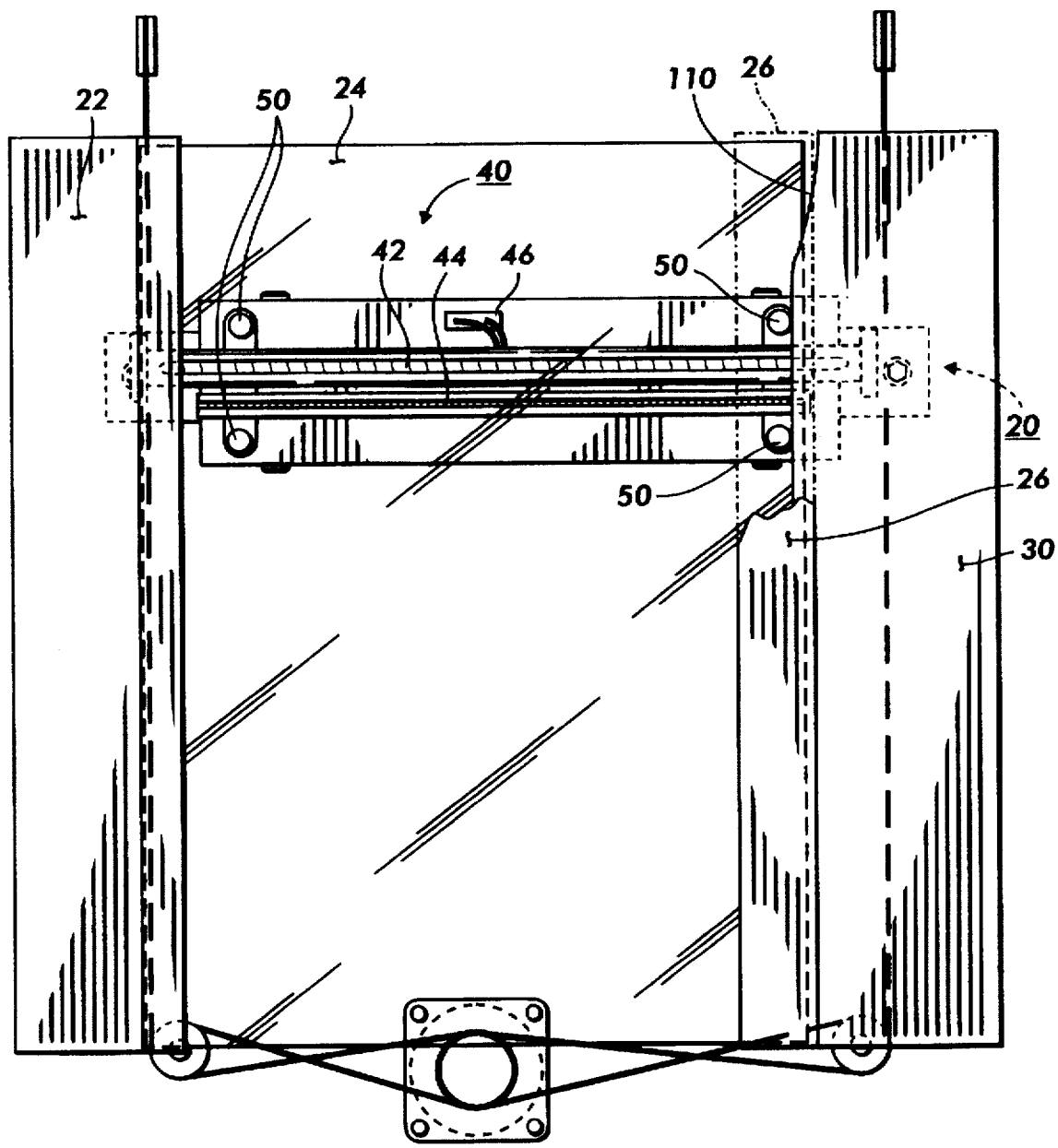
FIG. 2 presents a simplified top down view of a moving carriage imaging system according to the principles of the present invention.
Figure 3:
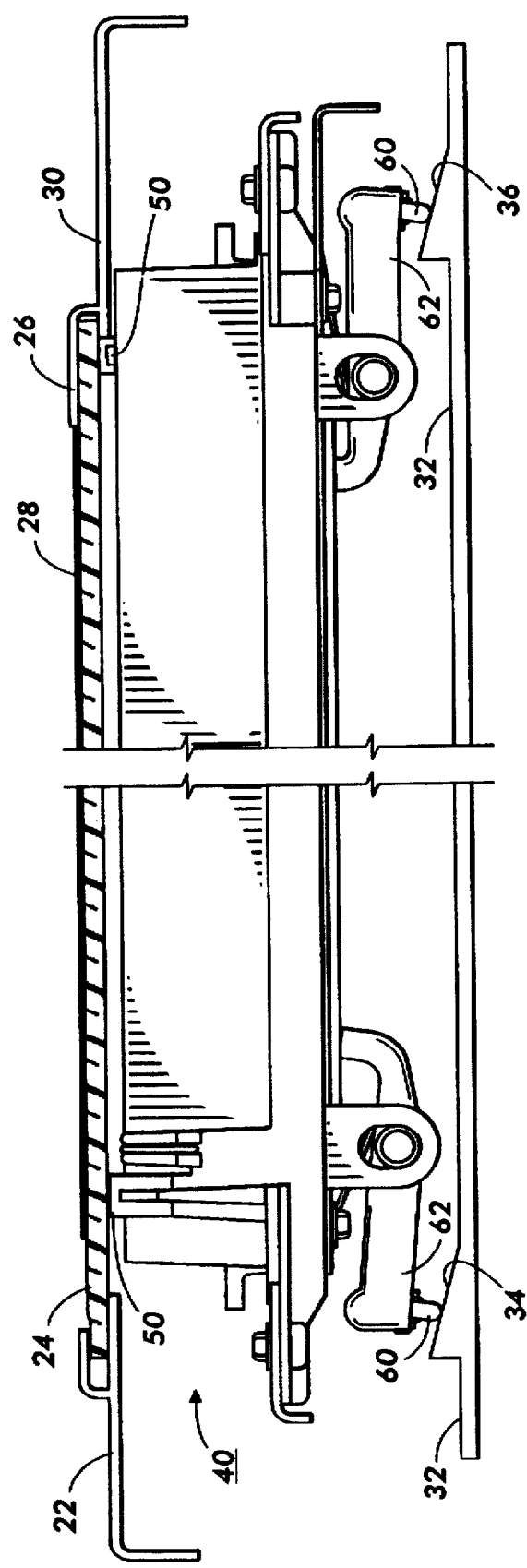
FIG. 3 presents a simplified cross-sectional view of the moving carriage system in FIG. 2.

FIGS. 2 and 3 illustrate a moving scan rail input scanner that is suitable for scanning an original document so as to produce a digitized version of the original document. Although the principles of the present invention are well suited for use in such input scanners, they are also well suited for use in other devices. Therefore it should be understood that the present invention is not limited to the particular embodiment illustrated in FIGS. 2 and 3 or to the particular application shown therein.

Refer to both FIGS. 2 and 3 in the following discussion. A preferred embodiment input scanner 20 is comprised of a frame 22 onto which is firmly mounted a glass platen 24. The frame 22 includes a document registration edge 26 that is used as a guide for locating a document 28 (shown only in FIG. 3) that is to be scanned. For clarity, FIG. 2 does not show a document on the platen 24 but FIG. 3 does. Furthermore, to render visible the components that are below the frame, FIG. 2 shows the frame 22 as being clear. In practice the frame is beneficially made of either sheet metal or solid plastic. Finally, it is to be understood that, depending upon the application, a document handling system, a document feeder, or an operator locates the document 28 in registration with the document registration edge 26. Therefore, in what follows it is assumed that a document is accurately located on top of the platen 24.

Turning now specifically to FIG. 3, the frame 22 also includes a carriage registration member 30 that is located below the platen and that runs parallel with the document registration edge 26.

Still referring to FIG. 3, located beneath the platen is a base 32 that includes tilted rail surfaces 34 and 36. As shown, those rail surfaces are tilted at an angle with respect to the plane of the platen 24. As will be obvious when the principles of the present invention are fully understood, the range of suitable angles is great. However, an angle of about 5 degrees is presently preferred. Beneficially, but not absolutely required, the base 32 can be an integral part of the frame 22. If the base is an integral part of the frame 22 major sections of the scan system can be fabricated together as a unit, thereby reducing overall cost and simplifying assembly.

Referring to both FIGS. 2 and 3, below the platen 24 is a moving carriage assembly 40. As shown in FIG. 2, that moving carriage assembly includes an elongated fluorescent lamp 42 that is housed in a frame with a narrow opening through which light illuminates a document 28 on the platen. The moving carriage assembly further includes a photodetector assembly 44 for digitizing the light reflected from the document. Also included is a harness assembly 46 for supplying electrical power to the lamp 42 and to the photodetector assembly 44, and for transmitting the digitized representation of the document to other electronics subsystems. The harness assembly 46 is flexible and is located such that it does interfere with the motion of the moving carriage assembly. Beneficially, the interior of the frame that holds the fluorescent lamp is made of a light reflective material. Furthermore the photodetector assembly is beneficially substantially enclosed within a metallic shield so as to reduce electromagnetic interference.

As previously discussed it is important that the moving carriage assembly is accurately located relative to the platen in the Y and Z directions. To help achieve this the moving carriage assembly includes 4 Teflon buttons 50. Turning now to FIG. 3, the tops of the Teflon buttons are located above the remainder of the moving carriage assembly and such that when the moving carriage assembly is biased against the platen (in a manner that is described subsequently) the moving carriage assembly rides on those buttons. Furthermore, as best shown in FIG. 2, two of those buttons are positioned to come into contact with the registration member 30.

Turning back to FIG. 3, the moving carriage assembly 40 further includes hard plastic rollers 60 that mount on spring biased pivot arms 62. Those pivot arms are biased such that the rollers 60 tend to be pushed away from the remainder of the moving carriage assembly with enough force to lift the remainder of the carriage assembly. Furthermore, the moving carriage assembly is dimensioned such that when one roller rides on the surface 36, another roller can ride on the surface 34, and also such that all three buttons 50 contact the platen 24 when the rollers ride on the surfaces 34 and 36.

Turning once again to FIG. 2, the moving carriage assembly 40 is attached at each end to a moving cable assembly that is configured to drive the moving carriage assembly back and forth in the X direction. If the buttons 50 adjacent the registration member 30 are not physically contacting the registration member, when the moving carriage assembly moves the lateral load component between the buttons and the platen, and between the surfaces 34 and 36 and the rollers 60, drop such that the moving carriage assembly slides down the surfaces 34 and 36, bringing the buttons 50 into contact with the registration member 30. Therefore, the relative positions of the document 28 and the carriage assembly and its photodetector assembly are controlled in the Y and Z directions by the buttons 50, the platen 24, the registration member 30, the rollers 60, and the bias from the pivot arms 62.

Still referring to FIG. 2, the registration member 30 includes a relatively small indentation 110 in the Y direction.

The purpose of that indentation is to correct a fault that might occur when using the moving carriage assembly. Because of any number of factors, such as sharp jars or impacts to the frame, to the platen, or to the moving carriage, it is possible for the buttons 50 that are adjacent to the registration member 30 to drop below the registration member. That is, the tops of those buttons might end up riding on the bottom of the registration member. The result would be defocusing of the scanned image and improper registration in the Y direction. To correct this problem should it occur, the indentation 110 is dimensioned and positioned such that when the cables drive the moving carriage toward one end of the platen, as the buttons 50 enter the indentation area they lose contact with the bottom of the registration member 30 and are biased up to the platen. Of course, the indentation should be configured such that it has a smooth transition edge so as to re-register the moving carriage assembly.

While the invention has been described with reference to the structure disclosed, it will be appreciated that numerous changes and modifications are likely to occur to those skilled in the art. For example, while the foregoing has described the use of four teflon buttons, in practice three buttons, two on one side of the maving carriage assembly and one on the other, might be better in some applications. Therefore, the present invention is intended to cover all changes and modifications which fall within the true spirit and scope of the invention.

We claim:

1. A moving carriage imaging system, comprised of:
   a frame having a registration member that extends in a first direction;
   a platen attached to said frame, said platen for receiving a substrate in a predetermined position relative to said registration member,
   a base disposed away from said platen, said base including a first tilted surface and a second tilted surface, wherein said first and second tilted surfaces extend substantially in said first direction;
   a moving carriage assembly disposed between said platen and said base, said moving carriage including;
   a housing;
   at least one button connected to said housing, said at least one button for contacting both said platen and said registration member,
   a first biased pivot arm attached to said housing;
   a second biased pivot arm attached to said housing;
   a first roller attached to said first biased pivot arm, said first roller for rolling on said first tilted surface; and
   a second roller attached to said second biased pivot arm, said second roller for rolling on said second tilted surface;
   a motion inducing system for moving said moving carriage assembly relative to said platen;
   wherein said moving carriage assembly is biased toward said registration member by said first and second rollers riding on said first and second tilted surfaces.

2. The moving carriage imaging system according to claim 1, wherein said moving carriage further includes a light source for illuminating a substrate on said platen and a sensor array for receiving light reflected from the substrate on said platen.

3. The moving carriage imaging system according to claim 1, wherein said motion inducing system includes:
   a cable attached to said moving carriage assembly: and
   a motor for driving said cable such that said moving carriage assembly is driven in the X direction.

4. The moving carriage imaging system according to claim 1, wherein said registration member includes an indentation.

* * * * *